US012335299B2

(12) United States Patent
Canfield (10) Patent No.: US 12,335,299 B2
(45) Date of Patent: Jun. 17, 2025

(54) CYBER SECURITY SYSTEM AND METHOD USING INTELLIGENT AGENTS

(71) Applicant: Raymond Canfield, Olney, MD (US)

(72) Inventor: Raymond Canfield, Olney, MD (US)

( * ) Notice: Subject to any disclaimer, the term of this patent is extended or adjusted under 35 U.S.C. 154(b) by 0 days.

(21) Appl. No.: 18/635,726

(22) Filed: Apr. 15, 2024

(65) Prior Publication Data

US 2024/0275811 A1 Aug. 15, 2024

Related U.S. Application Data

(60) Continuation of application No. 17/202,176, filed on Mar. 15, 2021, now Pat. No. 11,962,611, which is a division of application No. 15/566,691, filed as application No. PCT/US2016/042820 on Jul. 18, 2016, now abandoned.

(60) Provisional application No. 62/193,486, filed on Jul. 16, 2015.

(51) Int. Cl.
*H04L 29/06* (2006.01)
*H04L 9/40* (2022.01)
*G06F 40/10* (2020.01)
*G06N 5/02* (2023.01)
*H04L 41/22* (2022.01)

(52) U.S. Cl.
CPC ........ *H04L 63/1433* (2013.01); *H04L 63/145* (2013.01); *H04L 63/1491* (2013.01); *H04L 63/20* (2013.01); *G06F 40/10* (2020.01); *G06N 5/02* (2013.01); *H04L 41/22* (2013.01)

(58) Field of Classification Search
CPC ....... H04L 9/3263; H04L 9/14; H04L 9/3247; H04L 2209/84; H04L 9/002; H04L 9/006; H04L 9/0825; H04L 9/3252
See application file for complete search history.

(56) References Cited

U.S. PATENT DOCUMENTS

| | | | | |
|---|---|---|---|---|
| 8,756,698 B2 * | 6/2014 | Sidagni | ................. | G06F 21/577 709/200 |
| 9,619,655 B2 * | 4/2017 | Bach | ................... | H04L 63/1433 |
| 2003/0081621 A1 * | 5/2003 | Godfrey | ................. | H04L 67/10 370/400 |
| 2003/0217039 A1 * | 11/2003 | Kurtz | ................. | H04L 63/1408 |

(Continued)

FOREIGN PATENT DOCUMENTS

| | | | | |
|---|---|---|---|---|
| CN | 114915446 B | * | 8/2023 | |
| GB | 2520987 A | * | 6/2015 | ........... G06F 21/552 |
| KR | 20040069324 A | * | 8/2004 | |

*Primary Examiner* — Sher A Khan
(74) *Attorney, Agent, or Firm* — Intellectual Property Consulting, LLC; Mark N. Melasky (57) ABSTRACT

A cyber security method using intelligent agents (IAs) includes: watching, by the intelligent agent (IA), over a network, a software program running on a system; receiving, by the IA, results generated by the software; presenting, by the IA, the results; categorizing the results, by the IA, for efficient storage and efficient future retrieval; saving, by the IA, the categorized results; using the categorized results, by the IA, inferring new knowledge; categorizing the new knowledge, by the IA, for efficient storage and efficient future retrieval; saving, by the IA, the categorized new knowledge; and using one or more of the saved categorized results and the saved categorized new knowledge, by the IA, configuring the software.

13 Claims, 7 Drawing Sheets

(56) References Cited

U.S. PATENT DOCUMENTS

| | | | | |
|---|---|---|---|---|
| 2007/0050777 A1* | 3/2007 | Hutchinson | ......... | G06F 11/0781 |
| | | | | 718/104 |
| 2007/0097963 A1* | 5/2007 | Thermos | ............. | H04M 7/0078 |
| | | | | 370/352 |
| 2008/0235801 A1* | 9/2008 | Soderberg | ............. | G06F 21/563 |
| | | | | 726/25 |
| 2011/0277034 A1* | 11/2011 | Hanson | ................ | G06F 21/554 |
| | | | | 709/224 |
| 2015/0347900 A1* | 12/2015 | Bell | ........................ | G06N 5/02 |
| | | | | 706/11 |
| 2015/0356158 A1* | 12/2015 | Potapov | ............ | G06F 16/24542 |
| | | | | 707/718 |
| 2016/0072831 A1* | 3/2016 | Rieke | ................ | H04L 63/1433 |
| | | | | 726/1 |
| 2017/0171221 A1* | 6/2017 | Ho | .......................... | H04L 43/18 |
| 2018/0041533 A1* | 2/2018 | Chesla | .............. | G06F 16/24578 |

\* cited by examiner

CYBER SECURITY SYSTEM AND METHOD USING INTELLIGENT AGENTS

PRIORITY CLAIM

The present application is a continuation of U.S. patent application Ser. No. 17/202,176, filed Mar. 15, 2021, which is a divisional application of U.S. patent application Ser. No. 15/566,691, filed Oct. 13, 2017, which is a U.S. National Stage Entry of PCT/US2016/042820, filed Jul. 18, 2016, which claims the priority benefit of U.S. Provisional Patent Application No. 62/193,486 filed Jul. 16, 2015, each of which are incorporated by reference in their entireties as if fully disclosed herein.

SUMMARY

Embodiments of the invention relate in general to a cyber security system and method using intelligent agents. More specifically, embodiments of the invention relate to one or more of an offensive cyber security system and method using intelligent agents and a defensive cyber security system and method using intelligent agents.

A cyber security method using intelligent agents (IAs) includes: a) setting up, by the IA, a first network scan of a system over a network; b) running, by the IA, using a first network scan parameter, the first network scan, generating first network scan results; c) storing, by the IA, the first network scan results; d) running, by the IA, using a second network scan parameter, a second network scan of the system over the network, generating second network scan results; e) storing, by the IA, the second network scan results; f) running a port scan of the system, by the IA, generating port scan results; g) storing, by the IA, the port scan results in storage; h) using one or more of the first network scan results and the second network scan results, by the IA, optimizing the first network scan parameter; i) using one or more of the first network scan parameter and the second network scan parameter, configuring, by the IA, a vulnerability scan of the system over the network; j) using one or more of the first network scan parameter, the second network scan parameter, and the port scan results, running the vulnerability scan of the system, generating vulnerability scan results; k) storing, by the IA, the vulnerability scan results; l) collecting, by the IA, at least one of service information and availability knowledge regarding at least one of an available target and an available service; m) using the at least one of service information and availability knowledge, by the IA, identifying a needed setting; and n) storing, by the IA, the needed setting.

A cyber security method using intelligent agents (IAs) includes: watching, by the IA, over a network, a software program running on a system; receiving, by the IA, results generated by the software; presenting, by the IA, the results; categorizing the results, by the IA, for efficient storage and efficient future retrieval; saving, by the IA, the categorized results; using the categorized results, by the IA, inferring new knowledge; categorizing the new knowledge, by the IA, for efficient storage and efficient future retrieval; saving, by the IA, the categorized new knowledge; and using one or more of the saved categorized results and the saved categorized new knowledge, by the IA, configuring the software.

A cyber security method using intelligent agents (IAs) includes: seeking, by the IA, required configuration information from storage; determining, by the IA, that the required configuration information cannot be retrieved from storage; identifying, by the IA, a software program; running, by the IA, the software program; verifying, by the IA, that the required configuration information has been obtained; re-running the software program, by the IA, using the required configuration information, generating a result; reviewing the result, by the IA; determining, by the IA, that the result is acceptable; and using the result, by the IA, generating a result response.

A cyber security method using intelligent agents (IAs) includes: after initial setup, directing, by the IA, a knowledge base program to scan data comprised in a target; collecting, by the IA, configuration information required to run the target; using the configuration information, by the IA, attempting a connection to the target; passing, by the IA, to a human user interface target information regarding the target; using the human user interface, by the IA, accumulating pertinent knowledge regarding one or more of a connection method and target information; using the human user interface, by the IA, communicating with the target using the pertinent knowledge; using the human user interface, receiving, by the IA, a response to the command from the target; processing the response, by the IA, thereby generating a result; transmitting, by the IA, the result to the knowledge base program; using the knowledge base program, by the IA, processing the result; receiving the processed result, by the IA, from the knowledge base program; and transmitting, by the IA, the processed result to storage.

A cyber security method using intelligent agents (IAs) includes: after initial setup, directing, by the IA, a knowledge base program to scan data comprised in a target; collecting, by the IA, configuration information required to run the target; using the configuration information, by the IA, attempting a connection to the target; using one or more of a connection method and target information regarding the target, sending, by the IA, a command to the target; receiving, by the IA, a response to the command from the target; processing the response, by the IA, thereby generating a result; transmitting, by the IA, the result to the knowledge base program; using the knowledge base program, by the IA, processing the result; receiving the processed result, by the IA, from the knowledge base program; and transmitting, by the IA, the processed result to storage.

A cyber security method using intelligent agents (IAs) includes: observing, by the IA, traffic through a master system; identifying, by the IA, a vulnerability; diverting, by the IA, the vulnerability onto a temporary target; constructing, by the IA, a decoy system configured to replicate one or more of the appearance and the operation of the master system; and launching, by the IA, the decoy system.

A cyber security method using intelligent agents (IAs) includes: observing, by the IA, traffic through a master system; identifying, by the IA, a vulnerability; diverting, by the IA, the vulnerability onto a temporary target; tracking the vulnerability as it moves through the master system; investigating the vulnerability, generating investigation results; reporting the investigation results to the master system; storing the investigation results; constructing, by the IA, a decoy system configured to replicate one or more of the appearance and the operation of the master system; launching, by the IA, the decoy system; and reviewing, by the IA, effectiveness of the decoy system in promoting safety of the master system.

DETAILED DESCRIPTION

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The cyber security system and method using intelligent agents (IAs) includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Embodiments of the invention relate in general to a cyber security system and method using intelligent agents (IAs). More specifically, embodiments of the invention relate to one or more of an offensive cyber security system and method using IAs, a defensive cyber security system and method using IAs, and a system and method for tuning security software using IAs.

According to embodiments of the invention, an IA performs one or more of combatting and limiting exposure of a device to one or more of a hacker and a breach. According to further embodiments of the invention, the device belongs to one or more systems. According to yet other embodiments of the invention, the device belongs to one or more systems connected by Internet Protocol (IP). According to other embodiments of the invention, the device belongs to one or more systems connected by Industrial Control Systems (ICS). According to further embodiments of the invention, the device belongs to the Internet of Things (IoT). According to additional embodiments of the invention, the IA detects one or more of a change made by the hacker and a configuration error.

For example, the IA connects to the device over the network. For example, the IA logs into the device via one or more of a command shell, a web interface, and a IP port. For example, the IA performs one or more of communicating with the device and exchanging data with the device. For example, the IA thereby extracts information regarding one or more of the device and the device's functionality. For example, the IA can later use the extracted information in one or more security assessments.

For example, the IA assesses knowledge comprising one or more of a connection method, a measure of success of the connection, a quantity of information returned from the device using the connection method, and a type of information returned from the device using the connection method. For example, the type of information may comprise one or more of data, intelligence, and another type of information. The IA stores the knowledge. For example, the IA stores the knowledge locally. For example, the IA stores the knowledge locally in long-term storage (LTS). For example, the IA stores the knowledge remotely.

For example, the IA assesses and stores the knowledge to enable the IA to respond to one or more of failures, errors, and other types of non-optimum functioning. The IA continually assesses and stores additional knowledge to accomplish one or more of correcting errors and updating existing knowledge.

For example, the IA uses the knowledge to accomplish one or more of connecting to a device and correcting an error. For example, the IA uses the knowledge to connect to a target. For example, the target comprises one or more of a target device, a target sub-system, a target port, and another target. For example, the IA uses the knowledge to correct an error while performing one or more of maintaining a connection, optimizing a connection, and minimizing duplicated knowledge. For example, the IA uses the knowledge to correct an error while approximately simultaneously performing one or more of maintaining a connection, optimizing a connection, and minimizing duplicated knowledge.

For example, the IA connects to the target. For example, the IA initiates a command. For example, the IA uses the knowledge to initiate a command. For example, initiating the command comprises typing one or more characters in one or more of a keyboard and another input device. For example, initiating the command comprises answering one or more questions in a form. For example, initiating the command comprises answering one or more questions in an Internet form. For example, initiating the command comprises participating in an interactive session with a human. For example, the target comprises a human-IA interface configured to facilitate an interactive session between a human and the IA. For example, initiating the command comprises participating in the interactive session with the human using the human-IA interface.

For example, the IA investigates the network to acquire knowledge regarding one or more of the target and a service running on the target. For example, the IA stores the acquired knowledge. For example, the IA stores the acquired knowledge in LTS. For example, using the knowledge, the IA performs one or more of identifying a new system, identifying a change in an exiting system, and appropriately configuring a test of system vulnerability. For example, using the knowledge, the IA configures a test of system vulnerability. For example, using the knowledge, the IA appropriately configures software to test system vulnerability.

For example, the IA collects knowledge about the target to help intelligently schedule testing when the target will be least impacted. For example, the IA periodically checks on the target to ensure that the current configurations of the target are up to date. For example, the IA identifies a new service provided by the target. For example, the IA updates the configuration of the vulnerability scanning software to account for the new service.

For example, the IA uses a method that provides the most detailed knowledge about a desired data set. For example, the IA collects additional knowledge. For example, the IA processes the collected knowledge in order to perform one or more of configuring knowledge collection software and correcting errors in the knowledge collection software.

Figure 1:
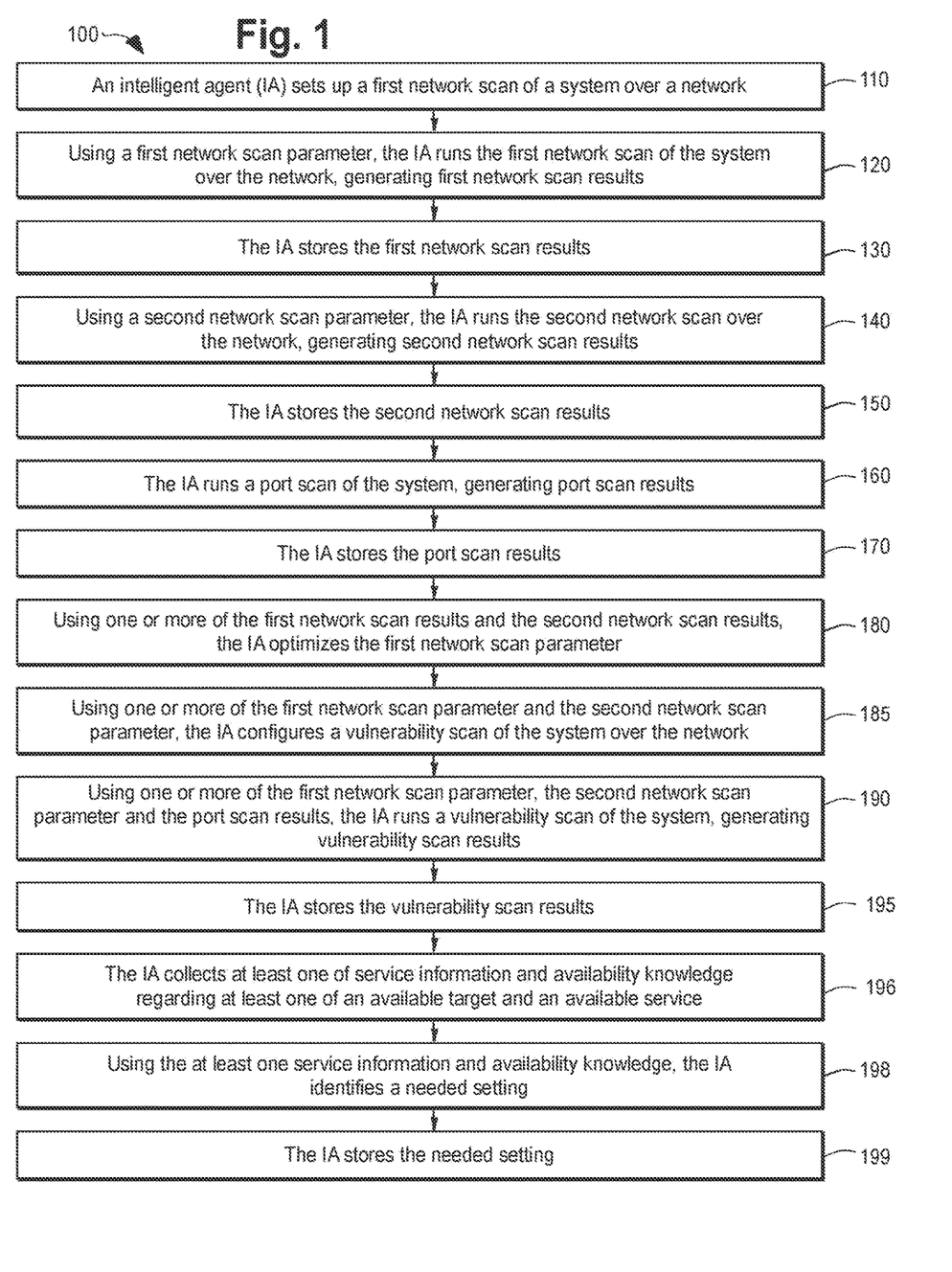
FIG. 1 is a flowchart of a method for promoting cyber security using intelligent agents (IAs) over a network.

FIG. 1 is a flowchart of a method 100 for promoting cyber security using intelligent agents over a network. The order of the steps in the method 100 is not constrained to that shown in FIG. 1 or described in the following discussion. Several of the steps could occur in a different order without affecting the final result.

In step 110, an intelligent agent (IA) sets up a first network scan of a system over a network. For example, setting up the first network scan comprises setting a first network scan parameter. For example, the first network scan parameter comprises one or more of a scan frequency, a scan wait time, a blast rate, and another network scan parameter. The scan frequency is defined as the elapsed time over which the IA scans the system. The scan wait time is defined as the time for which the IA awaits a response from a scanned target before assume that the target is not active. A non-active system may be one or more of not present, turned off, and otherwise non-active. Blast rate is defined as a number of targets the IA processes in parallel.

Block 110 then transfers control to block 120.

In step 120, using a first network scan parameter, the IA runs the first network scan of the system over the network, generating first network scan results. For example, running the first network scan comprises continually running the first network scan. For example, running the first network scan comprises continually running the first network scan in the background. For example, the network comprises one or more of the Internet, the World-Wide Web (WWW), Secure Shell (SSH), Simple Network Management Protocol (SNMP), command-line interface (CLI), and another network protocol configured to facilitate access to the system.

For example, the first network scan comprises one or more of an active scan of the network, a ping networking utility, a network mapping (NMAP) security scanner, and another first network scan. For example, the IA uses the first network scan results to accomplish one or more of maximizing a success rate, minimizing a scan time, minimizing a scan frequency, improving efficiency of scanning, and increasing scan frequency. For example, the first network scan determines a presence of a new system. For example, the first network scan determines an absence of an existing system.

For example, the first network scan generates first pings. For example, the first pings comprise frequent, multiple, low accuracy first pings. For example, the first pings have representative return times of approximately thirty seconds to approximately sixty seconds. For example, the first pings have representative return times of approximately thirty seconds to approximately sixty seconds for a system comprising 256 sub-systems. For example, the first pings have an accuracy between approximately eighty percent and approximately 95 percent. Block 120 then transfers control to block 130.

In step 130, the IA stores the first network scan results. For example, the IA stores the first network scan results in storage. For example, the IA stores the first network scan results in a long term storage. For example, the IA stores the first network scan results in memory. Block 130 then transfers control to block 140.

In step 140, using a second network scan parameter, the IA runs a second network scan over the network, generating second network scan results. For example, the step of running the second network scan comprises accessing the second network scan on an operating system of the system.

For example, the second network scan comprises one or more of an active scan of the network, a ping networking utility, an NMAP security scanner, and another second network scan. For example, the second network scan determines a presence or absence of a new system.

For example, the second network scan results have an accuracy of at least approximately ninety-five percent. The IA uses the highly accurate second network scan results in order to set the first network scan parameter for successfully future runs of the first network scan.

For example, the second network scan parameter comprises one or more of a number of target checks, a size of data being sent, and another second network scan parameter. For example, the second network scan determines details of a detected security threat.

For example, the second network scan generates second pings. For example, the second pings comprise infrequent, high accuracy second pings. For example, the second pings have an accuracy greater than or equal to approximately ninety-five percent. For example, the second pings have representative return times of approximately seventeen minutes to approximately twenty-two minutes for a system comprising 256 sub-systems. Block 140 then transfers control to block 150.

In step 150, the IA stores the second network scan results. For example, the IA stores the second network scan results in storage. For example, the IA stores the second network scan results in a second storage. For example, the IA stores the second network scan results in a long term storage. For example, the IA stores the second network scan results in memory.

The IA may also periodically determine if a new second network scan is needed. If the IA determines that the second network scan is needed, the IA performs the second network scan. For example, the IA monitors one or more of a performance of the system and an accuracy of the second network scan to determine when the IA runs the new second network scan. For example, the IA determines a frequency with which the IA runs the second network scan. Block 150 then transfers control to block 160.

In step 160, the IA runs a port scan of the system, generating port scan results. For example, the IA scans the network to identify one or more of a target, a scan time, and a scan frequency. For example, the IA runs a port scan using one or more of data stored in storage and environment information. For example, the environment information comprises one or more of network utilization information, system resource usage, and other environment information. Block 160 then transfers control to block 170.

In step 170, the IA stores the port scan results. Block 170 then transfers control to block 180.

In step 180, using one or more of the first network scan results and the second network scan results, the IA optimizes the first network scan parameter. The IA uses the optimized first network scan parameter in one or more of future first network scans, future second network scans and future port scans. Block 180 then transfers control to block 185.

In step 185, using one or more of the first network scan parameter and the second network scan parameter, the IA configures a vulnerability scan of the system over the network. Block 185 then transfers control to block 190.

In step 190, using one or more of the first network scan parameter, the second network scan parameter, and the port scan results, the IA runs a vulnerability scan of the system, generating vulnerability scan results. For example, the step of running the vulnerability scan comprises identifying an at-risk target. For example, identifying the at-risk target comprises identifying the at-risk target using one or more of pre-set risk determination parameters and risk determination parameters that are calculated on the fly.

For example, an at-risk target is defined as a target that is incurring one or more of a potential security risk and an actual security risk. Via the vulnerability scan, the IA identifies the at-risk target using one or more of pre-set risk determination parameters and risk determination parameters that are calculated on the fly. Block 190 then transfers control to block 195.

In step 195, the IA stores the vulnerability scan results in storage. For example, the IA stores an identified at-risk target in the storage for subsequent use, for example, use in later iterations. For example, for at least one at-risk target, the IA stores service information regarding the at least one at-risk target. For example, the service information comprises one or more of a port, an application, and a version. Block 195 then transfers control to block 196.

In step 196, the IA collects at least one of service information and availability knowledge regarding at least one of an available target and an available service. Block 196 then transfers control to block 198.

In step 198, the IA using the at least one of service information and availability knowledge, the IA identifies a needed setting. For example, the setting comprises one or more of a schedule, access, additional port information, a current status, an existing configuration, a new configuration, and another setting. Block 198 then transfers control to block 199.

In step 199, the IA stores the needed setting. For example, the IA stores the needed setting for use in running the vulnerability scanner. Block 199 then terminates the process.

For example, the method comprises an additional step of providing a device configured to perform one or more of tracking traffic and collecting information regarding the traffic.

Figure 2:
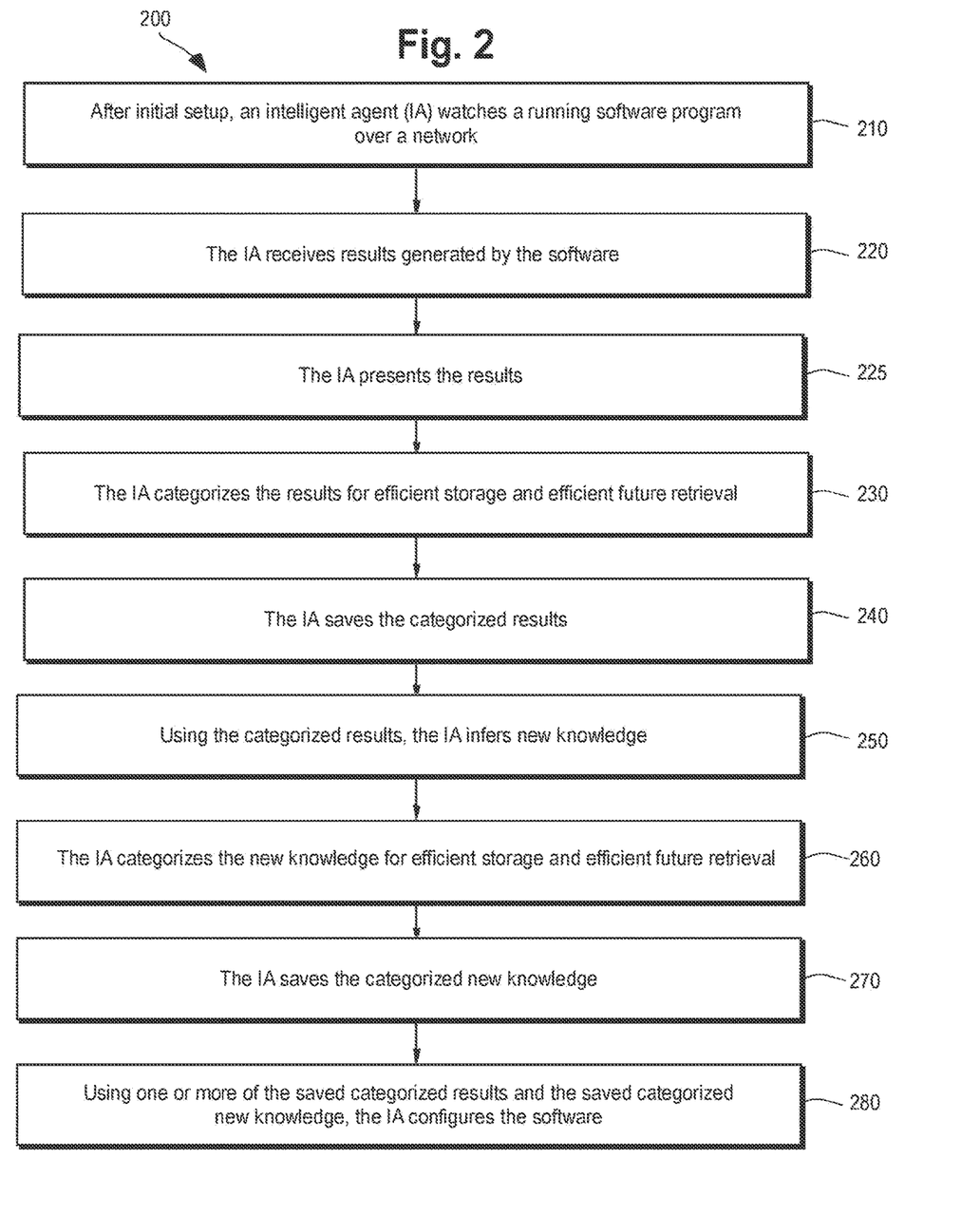
FIG. 2 is a flowchart of a method for promoting cyber security using intelligent agents (IAs) over a network.

FIG. 2 is a flowchart of a method 200 for promoting cyber security using intelligent agents over a network. The order of the steps in the method 200 is not constrained to that shown in FIG. 2 or described in the following discussion. Several of the steps could occur in a different order without affecting the final result.

In step 210, after initial setup, an intelligent agent (IA) watches a running software program over a network. For example, the IA watches the running software program to identify in the software one or more of an inefficiency, a deficiency, an incomplete aspect and an error. For example, the software comprises security software. For example, the software comprises security software configured to protect an enterprise. For example, the software comprises security software configured to collect one or more of an alert and additional information about the enterprise. Block 210 then transfers control to block 220.

In step 220, the IA receives results generated by the software. The IA presents the results. Block 220 then transfers control to block 225.

In step 225, the IA presents the results. For example, the IA presents the results for usage by a human user. For example, the IA presents the results for usage by a human user in one or more of an alert, a web page update, a graph, a database entry, and a report. Block 225 then transfers control to block 230.

In step 230, the IA categorizes the results for efficient storage and efficient future retrieval. Block 230 then transfers control to block 240.

In step 240, the IA saves the categorized results. Block 240 then transfers control to block 250.

In step 250, using the categorized results, the IA infers new knowledge. Block 250 then transfers control to block 260.

In step 260, the IA categorizes the new knowledge for efficient storage and efficient future retrieval. Block 260 then transfers control to block 270.

In step 270, the IA saves the categorized new knowledge. Block 270 then transfers control to block 280.

In step 280, using one or more of the saved results and the saved new knowledge, the IA configures the software. For example, the IA collects configuration information from storage. For example, the IA runs additional software until required configuration information exists in the storage. For example, the configuration information comprises one or more of an Internet Protocol (IP) address, login information, a device type, network access information, and other configuration information. For example, the login information comprises one or more of a user name, a password, an access key, and other login information. For example, the network access information comprises a network configured to access the target. For example, the network comprises one or more of the Internet, the World-Wide Web (WWW), Secure Shell (SSH), Simple Network Management Protocol (SNMP), command-line interface (CLI), and another network protocol configured to facilitate access to the device. Block 280 then terminates the process.

Figure 3:
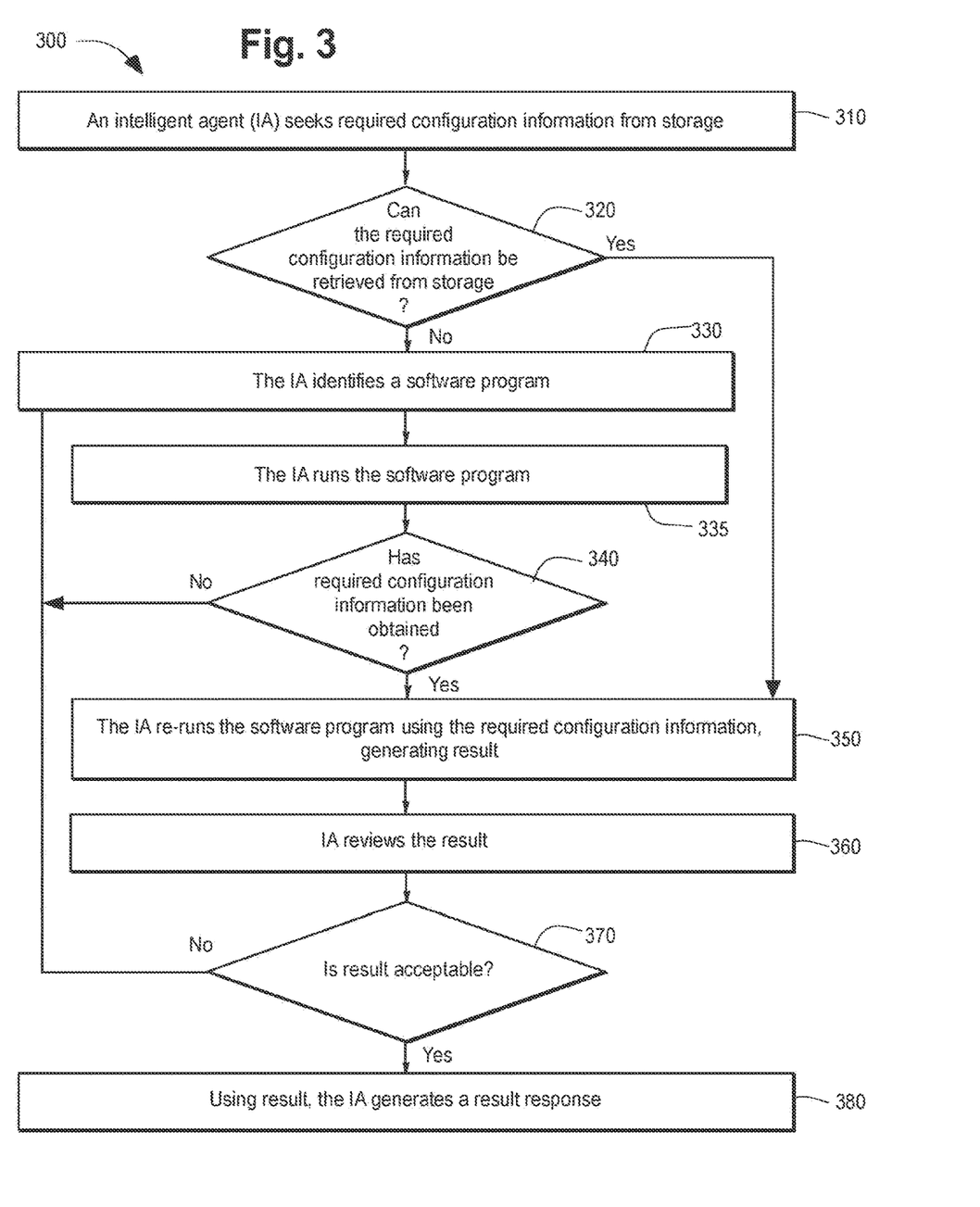
FIG. 3 is a flowchart of a method for promoting cyber security using intelligent agents (IAs) over a network.

FIG. 3 is a flowchart of a method 300 for promoting cyber security using intelligent agents over a network. The order of the steps in the method 300 is not constrained to that shown in FIG. 3 or described in the following discussion. Several of the steps could occur in a different order without affecting the final result.

In step 310, an intelligent agent (IA) seeks required configuration information from storage. Configuration information may be required when a security system is initially built and turned on. Alternatively, or additionally, configuration information may be required upon detection of a software problem. For example, the configuration information comprises one or more of an Internet Protocol (IP) address, login information, a device type, network access information, and other configuration information. For example, the login information comprises one or more of a user name, a password, an access key, and other login information. For example, the network access information comprises a network configured to access the target. For example, the network comprises one or more of the Internet, the World-Wide Web (WWW), Secure Shell (SSH), Simple Network Management Protocol (SNMP), command-line interface (CLI), and another network protocol configured to facilitate access to the device. The software problem can comprise one or more of an inefficiency in running the software and an error in running the software. Block 310 then transfers control to block 320.

In step 320, the IA determines if the required configuration information can be retrieved from storage. If no, the process proceeds to step 330. If yes, the process proceeds to step 350.

In step 330, the IA identifies a software program. Block 330 then transfers control to block 335.

In step 335, the IA runs the software program. Block 335 then transfers control to block 340.

In step 340, the IA verifies whether the required configuration information has been obtained. If yes, block 340 transfers control to block 350. If no, block 340 loops back to block 330.

In step 350, the IA re-runs the software program using the required configuration information, generating a result. Block 350 then transfers control to block 360.

In step 360, the IA reviews the result. Block 360 then transfers control to block 370.

In step 370, the IA determines if the result is acceptable. If yes, step 370 transfers control to step 380. If no, step 370 loops back to step 330.

In step 380, using the result, the IA generates a result response. For example, the result response comprises one or more of an alert, a web page update, a graph, a database entry, a report, recommended corrective action on the target, and another result response. Block 380 then terminates the process.

The IA will utilize and make a connection to the system's human user interface. For example, the human user interface comprises one or more of a Graphical User Interface (GUI), a Command Line Interface (CLI), and another human user interface. The IA will utilize knowledge that it has learned and stored. From that point, the IA will use its knowledge and understanding of interfaces to process through the interfaces and to interact with the target.

The IA has knowledge of various access methods to a target and when the access methods are available (some targets only have a single access method). The IA will determine (1) a target's access methods (if a method has been inaccessible on a target for a period of time), (2) resource allocation of various connection methods and (3) information available with each connection method. There are a few things the IA will be able to do with this information: (1) determine the most likely method to return as much of the information needed by the IA as possible; (2) prioritize the access methods to meet the IA's needs; and (3) if an access method fails, the IA utilizes another access method until all access methods have been exhausted.

The IA will be able to utilize investigative and discovery techniques and environment knowledge using its own algorithms and techniques to determine if the target may be unavailable.

For example, it could be that a Wireless Access Point provides only a Web GUI. In such a case, the IA will utilize appropriate forms and links. The IA will process and comprehend page information using techniques unique to the IA, for example including one or more of Natural Language Parsing and information about computers. This functionality allows for choices made by the IA in going to pages and filling out forms that will provide feedback and information that the IA is trying to gather.

For example, the IA knows about programs running on various targets. The IA knows about various data (configuration, databases, etc) that exist on various targets as part of software that might be installed onto the system. The IA knows how to find and read that data. The IA knows how to run various commands on the target and has knowledge of software options to generate various kinds of output and various formats of that output. The IA knows about how that software runs on a given target (where resources are maxed or when they start affecting the primary mission/purpose of that target). The IA knows how to comprehend one or more of the returned errors and limits of the software responses and uses one or more of proprietary algorithms and methods to circumvent those issues. The IA will utilize one or more of other software and other analytics when necessary to conclude events that cannot be fixed.

The IA will utilize its knowledge of the human user interface to authenticate where it has login information (username/password, a key, or other known authentication method). The IA will then work the interface as needed to gather and collect information it is seeking. If elevated privileges are granted by the authentication, the IA will utilize the heightened accesses to gain additional information as needed.

As the IA runs software in the CLI, forms are utilized in a GUI, or pages in a Web GUI provide English or formatted data designed for a human recipient, the IA will process those results in a number of techniques in order to establish knowledge to the IA and help the IA make decisions.

Figure 4:
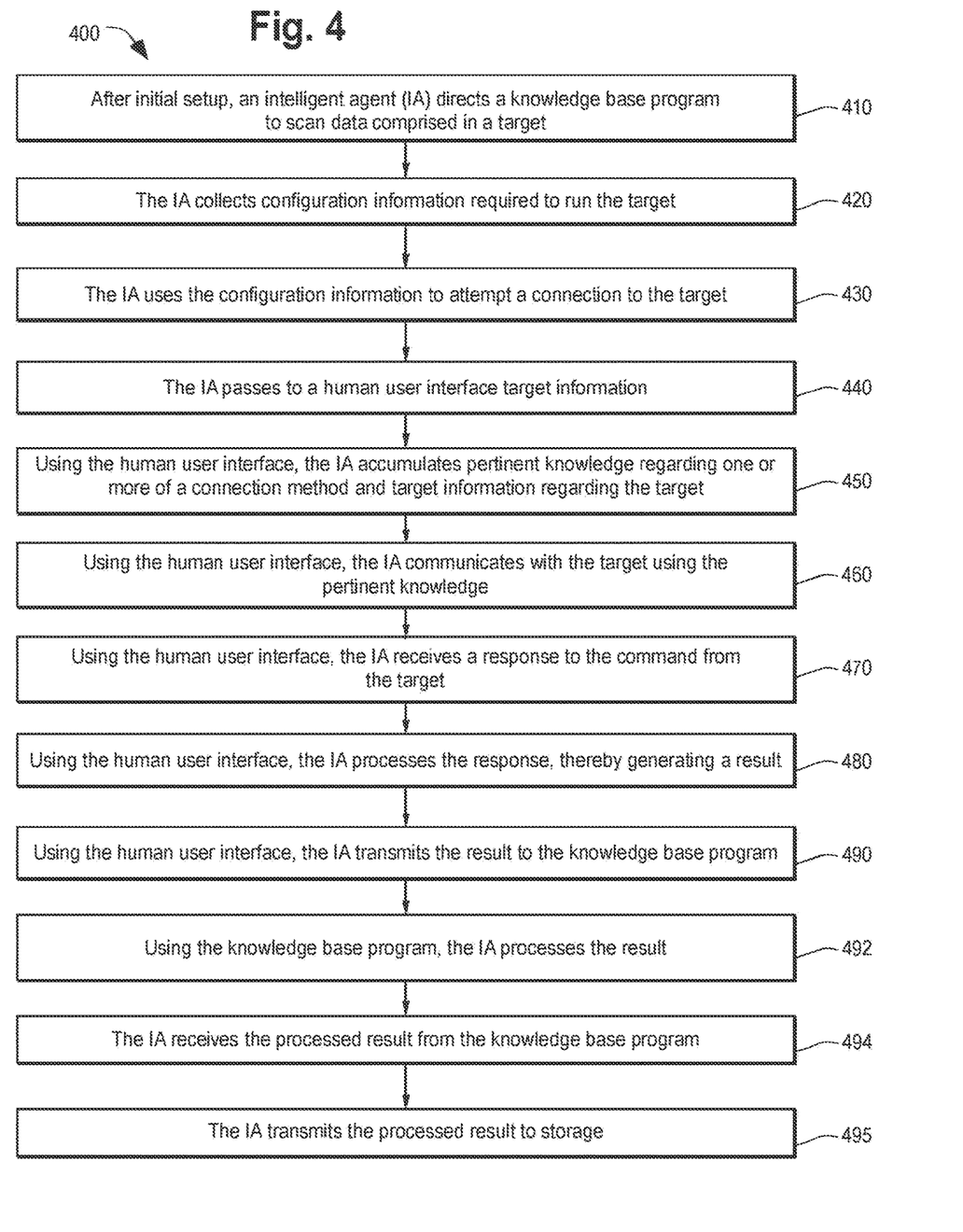
FIG. 4 is a flowchart of a method for promoting cyber security using intelligent agents (IAs) and a target over a network.

FIG. 4 is a flowchart of a method 400 for promoting cyber security using intelligent agents and a target over a network. The order of the steps in the method 400 is not constrained to that shown in FIG. 4 or described in the following discussion. Several of the steps could occur in a different order without affecting the final result.

In step 410, after initial setup, an intelligent agent (IA) directs a knowledge base program to scan data comprised in a target. For example, the target comprises a remote target. Block 410 then transfers control to block 420.

In step 420, the IA collects configuration information required to run the target. For example, the IA retrieves from storage the configuration information required to run the target. For example, the configuration information comprises one or more of an Internet Protocol (IP) address, login information, a target type, network access information, and other configuration information. For example, the login information comprises one or more of a user name, a password, an access key, and other login information. For example, the network access information comprises a network configured to access the target. For example, the network comprises one or more of the Internet, the World-Wide Web (WWW), Secure Shell (SSH), Simple Network Management Protocol (SNMP), command-line interface (CLI), and another network protocol configured to facilitate access to the target. Block 420 then transfers control to block 430.

In step 430, the IA uses the configuration information to attempt a connection to the target. For example, the IA attempts a connection to the target in descending order of estimated likelihood of success for the connection method, until a connection succeeds. Block 430 then transfers control to block 440.

In step 440, the IA passes to a human user interface target information regarding the target. For example, the human user interface comprises one or more of a Graphical User Interface (GUI), a Command Line Interface (CLI), and another human user interface. For example, the GUI comprises one or more of a hardware-based GUI and a Web GUI. For example, the target information comprises one or more of a command for the target, an instruction for the target, and a connection method to the target. Block 440 then transfers control to block 450.

In step 450, using the human user interface, the IA accumulates pertinent knowledge regarding one or more of a connection method and target information. Block 450 then transfers control to block 460.

In step 460, using the human user interface, the IA communicates with the target using the pertinent knowledge. For example, if the connection method is the WWW, using the human user interface, the IA completes an appropriate form request, repeating the process until the IA has no more requests available to make with the target. If the connection method is CLI, then using the human user interface, the IA types in commands on the target. Block 460 then transfers control to block 470.

In step 470, using the human user interface, the IA receives a response to the command from the target. For example, the IA receives the command response by, using the human user interface, gathering a result from the connection to the target. Block 470 then transfers control to block 480.

In step 480, using the human user interface, the IA processes the response, thereby generating a result. For example, processing comprises one or more of interpreting the response, categorizing the response, placing the response into storage, and processing the response in another way. Block 480 then transfers control to block 490.

In step 490, using the human user interface, the IA transmits the result to the knowledge base program. Block 490 then transfers control to block 492.

In step 492, using the knowledge base program, the IA processes the result. For example, using a processing block comprised in the knowledge base program, the IA processes the result. For example, using analyzer code, and using the processing block, the IA does one or more of parsing the result, processing the result, formatting the result, and transmitting the result to storage. Block 492 then transfers control to block 494.

In step 494, the IA receives the processed result from the knowledge base program. For example, the IA receives the processed result from a processing block comprised in the knowledge base program. Block 494 then transfers control to block 495.

In step 495, the IA transmits the processed result to storage. Block 495 then terminates the process.

The IA will gain knowledge about historical software runs and performance. The IA accumulates detailed knowledge of how the software operates. The detailed knowledge may comprise resource use data. The resource may comprise one or more of memory, central processing unit (CPU) usage, disk usage, and another resource. The resource use data may comprise data on use of one or more of resource quantity and the length of time for which a resource is used. Since resource use data is unique to a target, the target will generate unique historical details. The IA has the ability to investigate and to gain knowledge about specifics of the software, even at the binary level. The IA uses analytic knowhow to pinpoint various areas of concern in running the software in order to perform one or more of maximizing its usefulness and optimizing use of the target's primary mission.

The IA knows how to gather help to optimize running software. The IA detects improvements in the software over time. The IA will identify changes to software options when the IA detects one or more of new software versions and changed software versions. It is possible to have multiple versions of the same software on a target, allowing the IA to review one or more of options performance to utilize the best version for a current task assigned to the IA.

Figure 5:
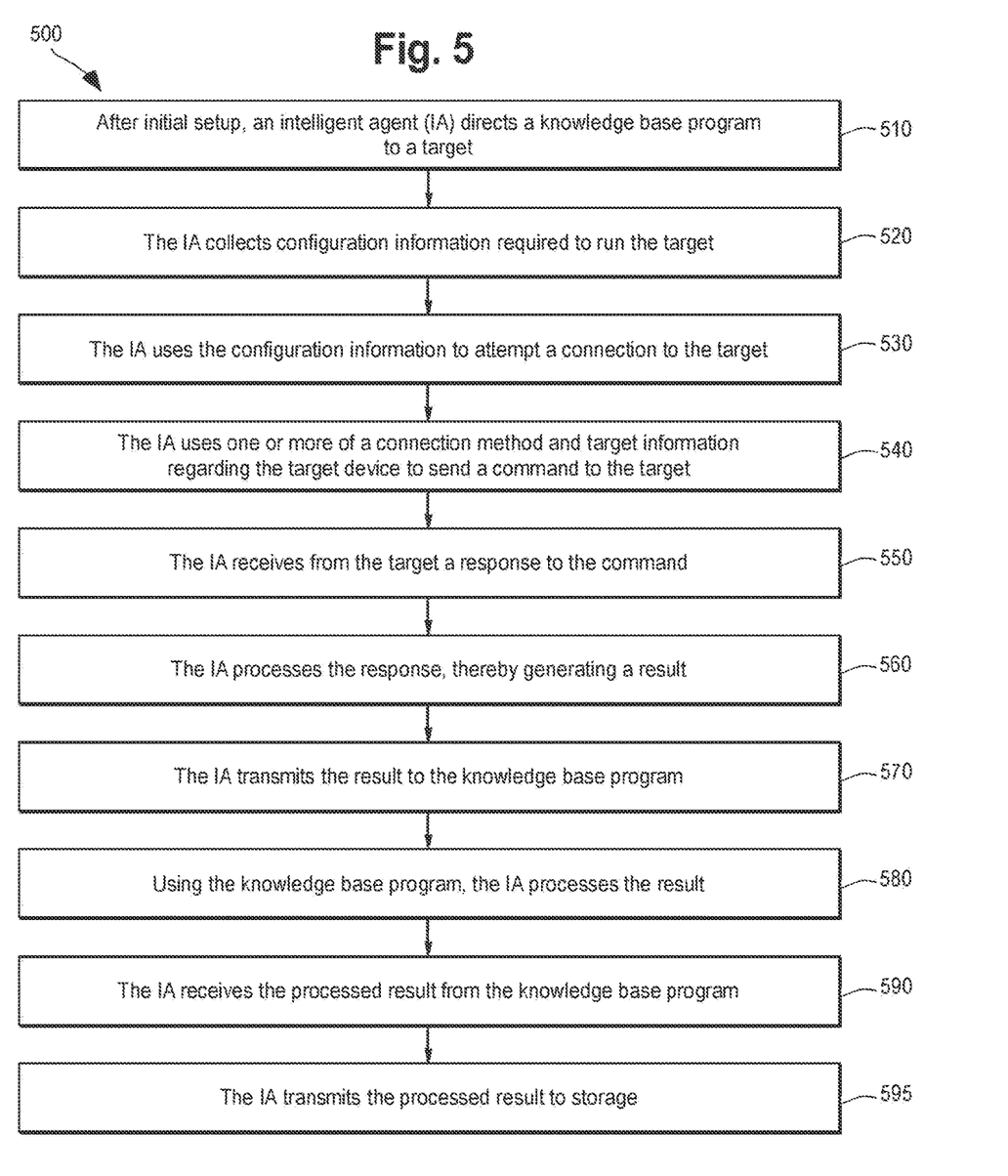
FIG. 5 is a flowchart of a method for promoting cyber security using intelligent agents (IAs) and a target over a network.

FIG. 5 is a flowchart of a method 500 for promoting cyber security using intelligent agents and a target over a network. The order of the steps in the method 500 is not constrained to that shown in FIG. 5 or described in the following discussion. Several of the steps could occur in a different order without affecting the final result.

In step 510, after initial setup, an intelligent agent (IA) directs a knowledge base program to a target. For example, the target comprises a remote target. The knowledge base program scans data comprised in one or more targets. For example, the knowledge base program scans data comprised in the target. Block 510 then transfers control to block 520.

In step 520, the IA collects configuration information required to run the target. For example, the IA collects the required configuration information from storage. For example, the configuration information comprises one or more of an Internet Protocol (IP) address, login information, a target type, network access information, and other configuration information. For example, the login information comprises one or more of a user name, a password, an access key, and other login information. For example, the network access information comprises a list of one or more networks configured to access the target. For example, the network access information comprises one or more of the World-Wide Web (WWW), Secure Shell (SSH), Simple Network Management Protocol (SNMP), command-line interface (CLI), and another network configured to access a device. Block 520 then transfers control to block 530.

In step 530, the IA uses the configuration information to attempt a connection to the target. For example, the IA attempts a connection to the target in descending order of estimated likelihood of success for the connection method, until a connection succeeds. Block 530 then transfers control to block 540.

In step 540, the IA uses one or more of a connection method and target information to send a command to the target. For example, the target information comprises a device type. For example, if the connection method is the WWW, the IA completes an appropriate form request, repeating the process until communication is attained with the target. If the connection method is command line interface (CLI), then the IA uses the user interface (UI) to enter a command to the target. Block 540 then transfers control to block 550.

In step 550, the IA receives from the target a response to the command. Block 550 then transfers control to block 560.

In step 560, the IA processes the response, thereby generating a result. For example, processing comprises one or more of interpreting the response, classifying the response, placing the response into storage, and processing the result in another way. Block 560 then transfers control to block 570.

In step 570, the IA transmits the result to the knowledge base program. Block 570 then transfers control to block 580.

In step 580, using the knowledge base program, the IA processes the result. For example, using a processing block comprised in the knowledge base program, the IA processes the result. For example, using analyzer code, and using the processing block, the IA does one or more of parsing the result, processing the result, formatting the result, and transmitting the result to storage. Block 580 then transfers control to block 590.

In step 590, the IA receives the processed result from the knowledge base program. For example, the IA receives the processed result from a processing block comprised in the knowledge base program. Block 590 then transfers control to block 595.

In step 595, the IA transmits the processed result to storage. Block 595 then terminates the process.

An enterprise is defined as a target under control of one or more of an agency, a company and an organization. Examples include one or more of a desktop computer, a notebook computer, a laptop computer, a server, a network, a printer, another Internet Protocol (IP)-connected target, and another enterprise. An IP-connected target can comprise one or more of an Internet Of Things (IoT) device and an Industrial Control System (ICS) device.

Vulnerability scanning software interacts with the target to generate proof that a vulnerability is exploitable. The vulnerability scanning software often uses methods beyond human capability to generate binary level adjustments to expose unknown vulnerabilities.

According to embodiments of the invention, the IA analyzes criticality of targets and scores the criticality in order to help establish which targets are critical. To perform the criticality scoring, the IA uses target information collected about a target. For example, the target information comprises one or more of a frequency of changes, a vulnerability history, a target type, a target location, services used by the target, service usages by the target, and other target information. For example, target location comprises proximity to a network. For example, target location comprises proximity to a public Internet. Closer proximity to the public Internet generally implies one or more of higher target visibility and increased risk of unauthorized access.

For example, a target on the edge of the enterprise that is experiencing 20,000 uses per second might have a relatively high level of exposure, thereby increasing its critical level. For example, the target comprises a web server. A web server internal to the enterprise that has three internal connections every couple of days might have a reduced level of exposure. While both web servers need monitoring and scanning, the former web server needs more frequent deep scanning. The internal web server also would get a deep scanning but not as frequently. At the same time, a web server might be more static. Therefore, a series of changes would be more suspicious and would increase the level of monitoring more sharply than in the case of a highly dynamic target. Since the highly dynamic target is already watched more closely and changes regularly, fewer suspicions would be raised by the same behavior observed in it compared to a static web server.

One advantage offered by embodiments of the invention is the ability for the IA to provide one or more of security monitoring and security defenses that are tailored to one or more of a specific target in the master system and the specific master system as a whole. This advantage is available from embodiments of the invention because, due to requests it receives from entities wishing to access the master system, the IA is constantly obtaining additional information that is unique to one or more of the master system as a whole and the individual target involved.

The master system can comprise an arbitrary number of data-generating devices. The data-generating device can comprise one or more of a monitoring target, security software, a network monitoring tool, and another data-generating device. Security software provided by the IA may comprise one or more of asset management software, scanning of targets for known vulnerabilities, application scanning for detection of known attack methods, network scanning software, and other security software. The network scanning software comprises software configured to explore security weather patterns comprising one or more of a new device, a new service on an existing device, a changed service on an existing device, a change in a traffic pattern to a target, and a change in a traffic pattern from a target. This weather pattern collection differs from current systems in that current systems are sitting on a high traffic gateway. According to embodiments of the invention, small, inexpensive devices may be distributed throughout the master system to perform one or more of tracking traffic and collecting information regarding traffic. This includes being able to see traffic between two systems connected by a switch.

Utilizing one or more of inbound information, algorithms, and methods, the IA adjusts one or more commands the IA is running to perform one or more of gathering, validating and generating data knowledge. This command adjustment may comprise one or more of blocking traffic, un-installing software, stopping a process, prohibiting binaries from running, building a temporary target, and diverting traffic to the temporary target. The IA may build a decoy system, the decoy system configured to replicate one or more of the appearance and the operation of the system, which we may call the master system. The decoy system may use decoy data unrelated to genuine data from the master system. The IA may perform one or more of collecting and observing traffic through the master system. For example, the IA may thereby identify a vulnerability. For example, the vulnerability comprises one or more of a new vulnerability, a pattern indicating a vulnerability, a series of communication events indicating a vulnerability, a new attack method, malware, a computer virus, a document comprising a secret, and another vulnerability.

The IA may construct the decoy system. For example, the decoy system is configured to mislead an attacker into thinking he has entered into the master system.

For example, for the decoy system one or more of an operating system, an application, a software version, a patch, and another decoy system parameter is substantially the same as in the master system. For example, wherever possible, content of the decoy system is substantially identical to content of the master system. For example, a decoy team collaboration software system comprises decoy company documents. For example, a decoy billing system comprises decoy credit card data that appears to comply with the Payment Card Industry Data Security Standards (PCI-DSS).

For example, the IA can create an additional decoy system if the attacker tries to move beyond the first decoy system. The IA can observe the attacker's actions, and if the attacker is successful, can take corrective actions on one or more of the real system and a real network. The IA can do one or more of detect and divert data that may be vulnerable to the attacker. For example, the vulnerable data comprises one or more of a software application, a media, a document, and other vulnerable data. For example, the vulnerable media comprises one or more of a movie, an audio file, and other vulnerable media. For example, the vulnerable, document comprises one or more of a word processing document, a spreadsheet, and another vulnerable document. For example, the vulnerable data can be transmitted by one or more of electronic mail, a file transfer, the Internet, and another vulnerable data transmission method.

For example, the IA diverts the vulnerability onto a temporary target. For example, the temporary target comprises a temporary storage. Then the IA profiles the vulnerable data. Effectively, the IA thereby gathers fingerprint information about the vulnerable data. Using the vulnerable data profile, the IA tracks the vulnerable data as it moves through the master system. If the IA later identifies vulnerable data as malicious data, the IA will already have knowledge of all the targets through which the vulnerable data passed. Next, the IA investigates the data. For example, investigating comprises one or more of virus scanning, binary analysis, text analysis, steganalysis, and other investigating.

Figure 6:
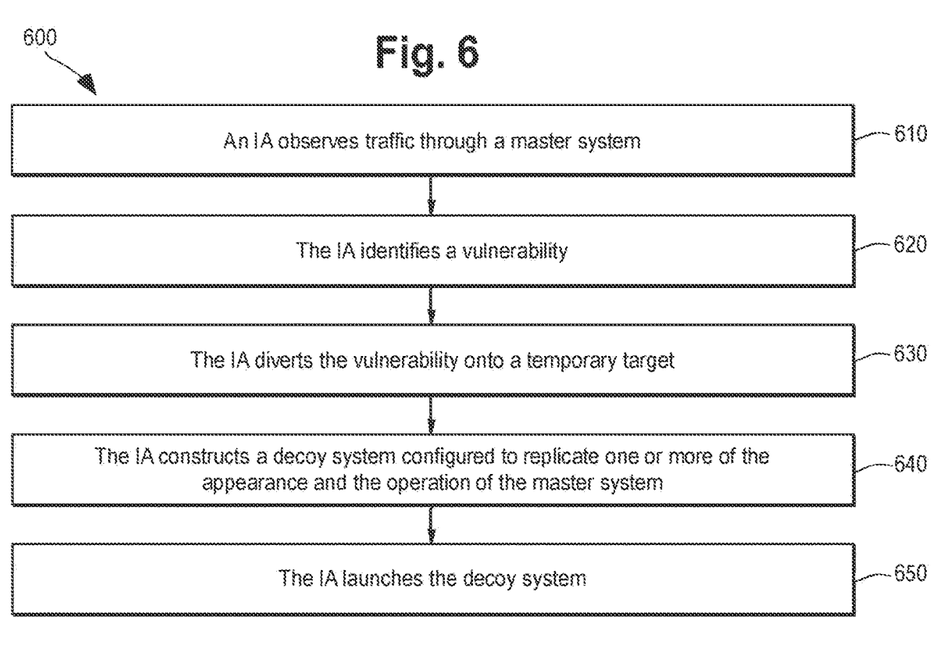
FIG. 6 is a flowchart of a method for promoting cyber security using intelligent agents (IAs) and a target over a network.

FIG. 6 is a flowchart of a method 600 for promoting cyber security using intelligent agents and a target over a network. The order of the steps in the method 600 is not constrained to that shown in FIG. 6 or described in the following discussion. Several of the steps could occur in a different order without affecting the final result.

In step 610, an intelligent agent (IA) observes traffic through a master system. Block 610 then transfers control to block 620.

In step 620, the IA identifies a vulnerability. Block 620 then transfers control to block 630.

In step 630, the IA diverts the vulnerability onto a temporary target. Block 630 then transfers control to block 640.

In step 640, the IA constructs a decoy system configured to replicate one or more of the appearance and the operation of the master system. Block 640 then transfers control to block 650.

In step 650, the IA launches the decoy system. Block 650 then terminates the process.

Figure 7:
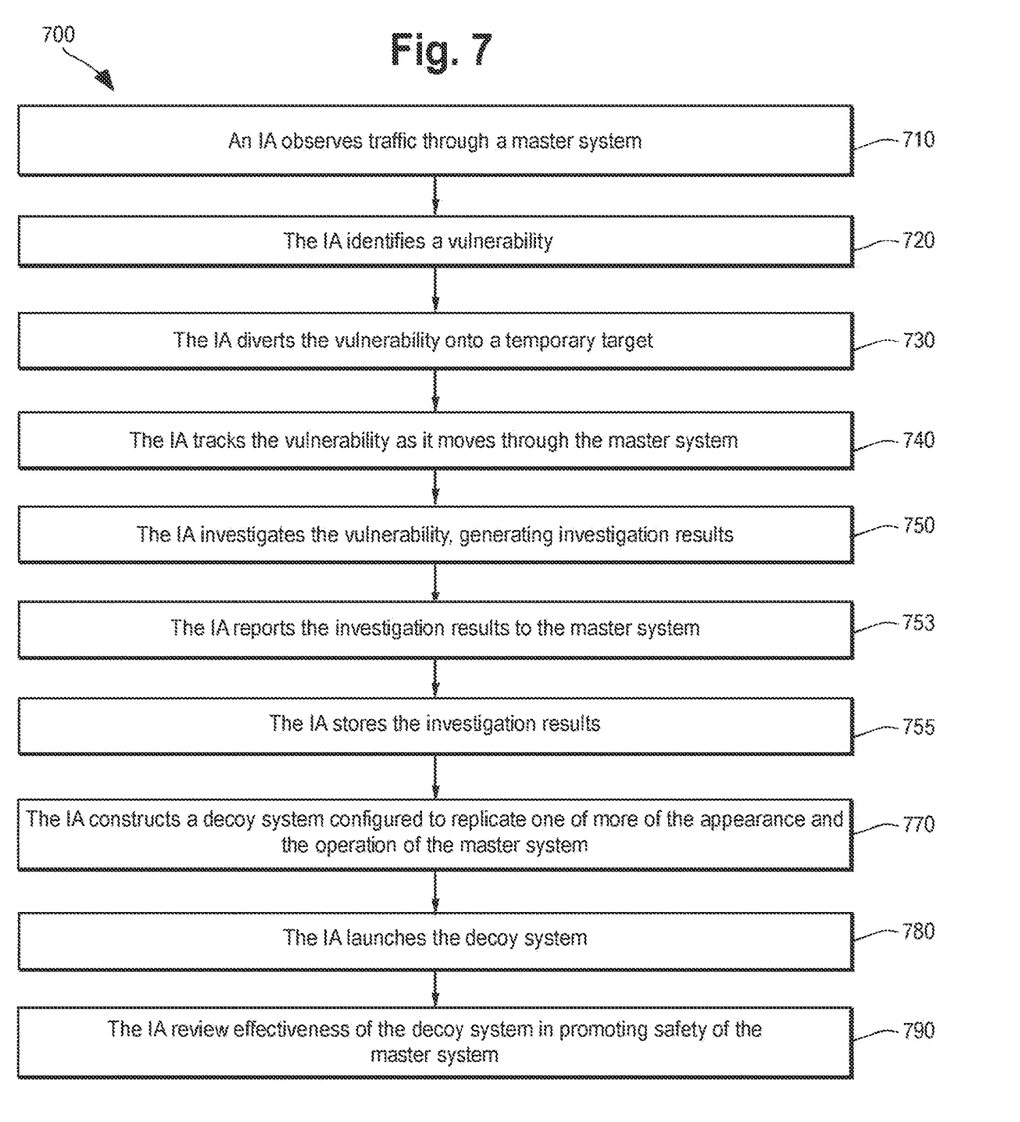
FIG. 7 is a flowchart of a method for promoting cyber security using intelligent agents (IAs) and a target over a network.

FIG. 7 is a flowchart of a method 700 for promoting cyber security using intelligent agents and a target over a network. The order of the steps in the method 700 is not constrained to that shown in FIG. 7 or described in the following discussion. Several of the steps could occur in a different order without affecting the final result.

In step 710, an intelligent agent (IA) observes traffic through a master system. Block 710 then transfers control to block 720.

In step 720, the IA identifies a vulnerability. Block 720 then transfers control to block 730.

In step 730, the IA diverts the vulnerability onto a temporary target. Block 730 then transfers control to block 740.

In step 740, the IA tracks the vulnerability as it moves through the master system. Block 740 then transfers control to block 750.

In step, the IA investigates the vulnerability, generating investigation results. Block 750 then transfers control to block 753.

In step 753, the IA reports the investigation results to the master system. Block 753 then transfers control to block 755.

In step 755, the IA stores the investigation results. Block 755 then transfers control to block 770.

In step 770, the IA constructs a decoy system configured to replicate one or more of the appearance and the operation of the master system. Block 770 then transfers control to block 780.

In step 780, the IA launches the decoy system. Block 780 then transfers control to block 790.

In step 790, the IA reviews effectiveness of the decoy system in promoting safety of the master system. Block 790 then terminates the process.

For example, network scanning detects a new service in a target. In response, the IA creates an alert to a person to require human authorization of the service. Alternatively, or additionally, in response, long before the human is involved, the IA addresses the suspicious network behavior. For example, the IA performs enhanced network monitoring to do one or more of categorize, classify and identify the traffic. Commonly the IA performs this in ways that cannot be replicated by humans. The IA increases one or more of vulnerability scanning and network scanning that targets the host of the suspicious traffic. This can be done using one or more of software designed to expose Cross-Site-Scripting (CXX), database injections, and remote command execution.

For example, asset information indicates a change in a target. In response, the IA creates an alert to a person to require human authorization of the change. Alternatively, or additionally, the IA investigates the changes. Alternatively, or additionally, the IA generates network scanning to analyze one or more of traffic to the target and traffic from the target. Commonly the IA performs this in ways that cannot be replicated by humans. The IA can initiate additional processing directly on the target. The additional processing may continue until the behavior has been identified as not a threat. The additional processing may continue until the behavior has been one or more of authorized by the IA, authorized by the human, and corrected.

When the IA needs to make a deterministic decision, the IA can leverage neural-network (NN) technology. The IA can create an NN. The IA will generate training data and correct the NN as desired. The IA will analyze the NN in ways a human cannot, in order to provide efficient, fast results. These results are then used by the IA to make decisions.

The NN can be generated new when needed, or one or more of NN structure and NN information can be stored for later retrieval and use. The IA can classify the NN for later use. The IA can study one or more of an NN's design and an NN's function to improve one or more of the NN and results. The IA maintains knowledge of one or more of the various NN's it has and their performance in order to do one or more of creating better future NN's and enhancing the current NN's that the IA has in memory.

For example, the IA will use Elasticsearch, Logstash, and Kibana (ELK) for one or more of processing of events and logging data. For example, the IA uses stored ELK data when constructing an NN for a needed decision. The IA builds the NN based on one or more of what needs to be analyzed and the security controls to be implemented. Using the results of the NN, the IA does one or more of creating blocks, adjusting blocks, and applying security controls to components in the master system. For example, the IA implements one or more of a firewall rule, a spam rule for electronic mail, and another rule.

For example, it will be understood by those skilled in the art that software used by the cyber security system and method using intelligent agents can be located in any location in which it may be accessed by the system. It will be further understood by those of skill in the art that the number of variations of the network, location of the software, and the like are virtually limitless. It is intended, therefore, that the subject matter in the above description shall be interpreted as illustrative and shall not be interpreted in a limiting sense.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. Other representative embodiments can be implemented using one or more of different configurations and different components.

For example, it will be understood by those skilled in the art that software used by the cyber security system and method using intelligent agents may be located in any location in which it may be accessed by the system. For example, it will be understood by one of ordinary skill in the art that the order of certain fabrication steps and certain components can be altered without substantially impairing the functioning of the invention. It is intended, therefore, that the subject matter in the above description shall be interpreted as illustrative and shall not be interpreted in a limiting sense.

What is claimed is:

1. A cyber security method using intelligent agents (IAs), comprising: a) setting up, by the IA, a first network scan of a system over a network; b) running, by the IA, using a first network scan parameter, the first network scan generating first pings which comprise frequent, multiple low accuracy pings, having a first accuracy, between 80% and 95%, generating first network scan results; c) storing, by the IA, the first network scan results; d) running, by the IA, using a second network scan parameter, a second network scan of the system over the network, the second network scan generating high accuracy second pings which are infrequent relative to the first pings, the second network scan having a second accuracy greater than 95%, generating second network scan results; e) storing, by the IA, the second network scan results and setting the first network scan parameter for future runs of the first network scan; f) running a port scan of the system, by the IA, generating port scan results; g) storing, by the IA, the port scan results; h) using one or more of the first network scan results and the second network scan results, by the IA, optimizing the first network scan parameter; i) using one or more of the first network scan parameter, the second network scan parameter, and the port scan results, configuring, by the IA, a vulnerability scan of the system over the network; j) using one or more of the first network scan parameter, the second network scan parameter, and the port scan results, running the vulnerability scan of the system, generating vulnerability scan results; k) storing, by the IA, the vulnerability scan results for use in later iterations; l) collecting, by the IA, at least one of service information comprising one or more of a port, an application, and a version and availability knowledge regarding at least one of an available target and an available service; m) using the at least one of service information and availability knowledge, by the IA, identifying a setting for use in running the vulnerability scan; and n) storing, by the IA, the setting.

2. The method of claim 1, wherein the step of running the first network scan comprises one or more of analyzing criticality of a target, scoring the criticality of the target, and exploring a security weather pattern.

3. The method of claim 2, wherein the security weather pattern comprises one or more of new devices, a new service on an existing device, a changed service on an existing device, a change in traffic to a target, and a change in traffic from a target.

4. The method of claim 2, wherein the analyzing comprises collecting target information; and using the target information to perform the analysis.

5. The method of claim 2, wherein the scoring comprises collecting target information; and using the target information to perform the scoring.

6. The method of claim 1, wherein the step of running the first network scan comprises running the first network scan using one or more of active scans of the network, a ping networking utility, a network mapping (NMAP) security scanner, and another first network scan.

7. The method of claim 6, wherein the step of running the first network scan comprises a sub-step of: actively scanning the network, by the IA.

8. The method of claim 7, wherein the step of running comprises using the first network scan results to accomplish one or more of maximizing a success rate, minimizing a scan time, minimizing a scan frequency, improving efficiency of scanning, and increasing the scan frequency.

9. The method of claim 1, comprising additional steps, performed after the optimizing step h), of: o) determining that a new second network scan is needed; and p) returning to the step of d) running a second network scan.

10. The method of claim 1, comprising an additional step, performed after the optimizing step h), of: o) using the optimized first network scan parameter, by the IA, in one or more of first network scans, a second network scans, a port scans, and a vulnerability scan.

11. The method of claim 1, wherein the step of running a port scan comprises scanning the network to identify one or more targets, a scan time, and a scan frequency.

12. The method of claim 1, wherein the step of running the vulnerability scan comprises identifying an at-risk target.

13. The method of claim 12, wherein identifying the at-risk target comprises identifying the at-risk target using one or more of pre-set risk determination parameters and risk determination parameters that are calculated on the fly.

* * * * *